(12) United States Patent
Garrard et al.

(10) Patent No.: US 10,101,180 B2
(45) Date of Patent: Oct. 16, 2018

(54) VARIABLE RELUCTANCE SENSOR INTERFACES WITH CLEARING AND METHODS OF THEIR OPERATION

(71) Applicant: NXP USA, Inc., Austin, TX (US)

(72) Inventors: Mike R. Garrard, Essex (GB); William E. Edwards, Dexter, MI (US)

(73) Assignee: NXP USA, INC., Austin, TX (US)

( * ) Notice: Subject to any disclaimer, the term of this patent is extended or adjusted under 35 U.S.C. 154(b) by 0 days.

(21) Appl. No.: 15/655,410

(22) Filed: Jul. 20, 2017

(65) Prior Publication Data

US 2017/0314968 A1 Nov. 2, 2017

Related U.S. Application Data

(62) Division of application No. 14/156,034, filed on Jan. 15, 2014, now Pat. No. 9,726,519.

(51) Int. Cl.
| | |
|---|---|
| *F02P 7/00* | (2006.01) |
| *G01D 5/20* | (2006.01) |
| *F02P 7/067* | (2006.01) |
| *F02P 5/145* | (2006.01) |
| *G01B 7/14* | (2006.01) |
| *F02P 1/00* | (2006.01) |

(52) U.S. Cl.
CPC .......... *G01D 5/2013* (2013.01); *F02P 7/0675* (2013.01); *F02P 1/00* (2013.01); *F02P 5/145* (2013.01); *G01B 7/14* (2013.01)

(58) Field of Classification Search
CPC ....... G01D 5/2013; G01B 7/14; F02P 7/0675; F02P 1/00; F02P 5/145
See application file for complete search history.

(56) References Cited

U.S. PATENT DOCUMENTS

| | | | | |
|---|---|---|---|---|
| 4,457,286 A * | 7/1984 | Katayama | ............. | F02P 15/008 123/612 |
| 5,570,052 A * | 10/1996 | Fonderie | ................ | H03K 5/082 327/103 |
| 5,977,765 A * | 11/1999 | Gibson | ............... | F02D 41/0097 324/165 |
| 6,674,279 B2 * | 1/2004 | Manlove | ................... | G01D 3/02 324/166 |
| 9,176,159 B2 * | 11/2015 | Edwards | ................... | G01D 5/20 |
| 9,726,519 B2 * | 8/2017 | Garrard | ................ | G01D 5/2013 |
| 2013/0328554 A1 * | 12/2013 | Pigott | .................. | G01D 5/2013 324/207.25 |
| 2014/0035561 A1 * | 2/2014 | Pigott | ..................... | G01P 3/488 324/166 |

* cited by examiner

*Primary Examiner* — Thomas Moulis

(57) ABSTRACT

The embodiments described herein include systems with a variable reluctance sensor (VRS) interface and methods of their operation. Embodiments of VRS interfaces include a clearing signal generator configured to generate a clearing signal corresponding with the timing of a noise event. The clearing signal may be configured to clear a post-processing circuit.

15 Claims, 7 Drawing Sheets

VARIABLE RELUCTANCE SENSOR INTERFACES WITH CLEARING AND METHODS OF THEIR OPERATION

RELATED APPLICATION

This application is a divisional of co-pending, U.S. patent application Ser. No. 14/156,034, filed on Jan. 15, 2014.

TECHNICAL FIELD

Embodiments of the subject matter described herein relate generally to variable reluctance sensors.

BACKGROUND

Variable reluctance sensors (VRSs) are commonly used to measure the angular position and/or speed of a moving or rotating ferromagnetic object. For example, they can be used to measure the angular position and/or speed of a rotating wheel having one or more teeth. One such application is the crankshaft of an automobile. For example, a toothed ferrous (iron based) wheel is mounted to the crankshaft and the VRS is used to sense each passing tooth during rotation of the crankshaft.

In such an application crankshaft position can be used to set engine timing for engine control including ignition and fuel injection timing and the like. The VRS typically includes a coil and biasing magnet positioned near the toothed wheel, in which each tooth passing by the VRS changes the magnetic flux which is converted to an electrical voltage induced in the coil. A VRS interface senses and conditions the electrical signal to derive timing parameters. In this manner, the rotating motion of the crankshaft is converted to an electronic signal which is used to determine the position and speed of the crankshaft.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

Figure 1:
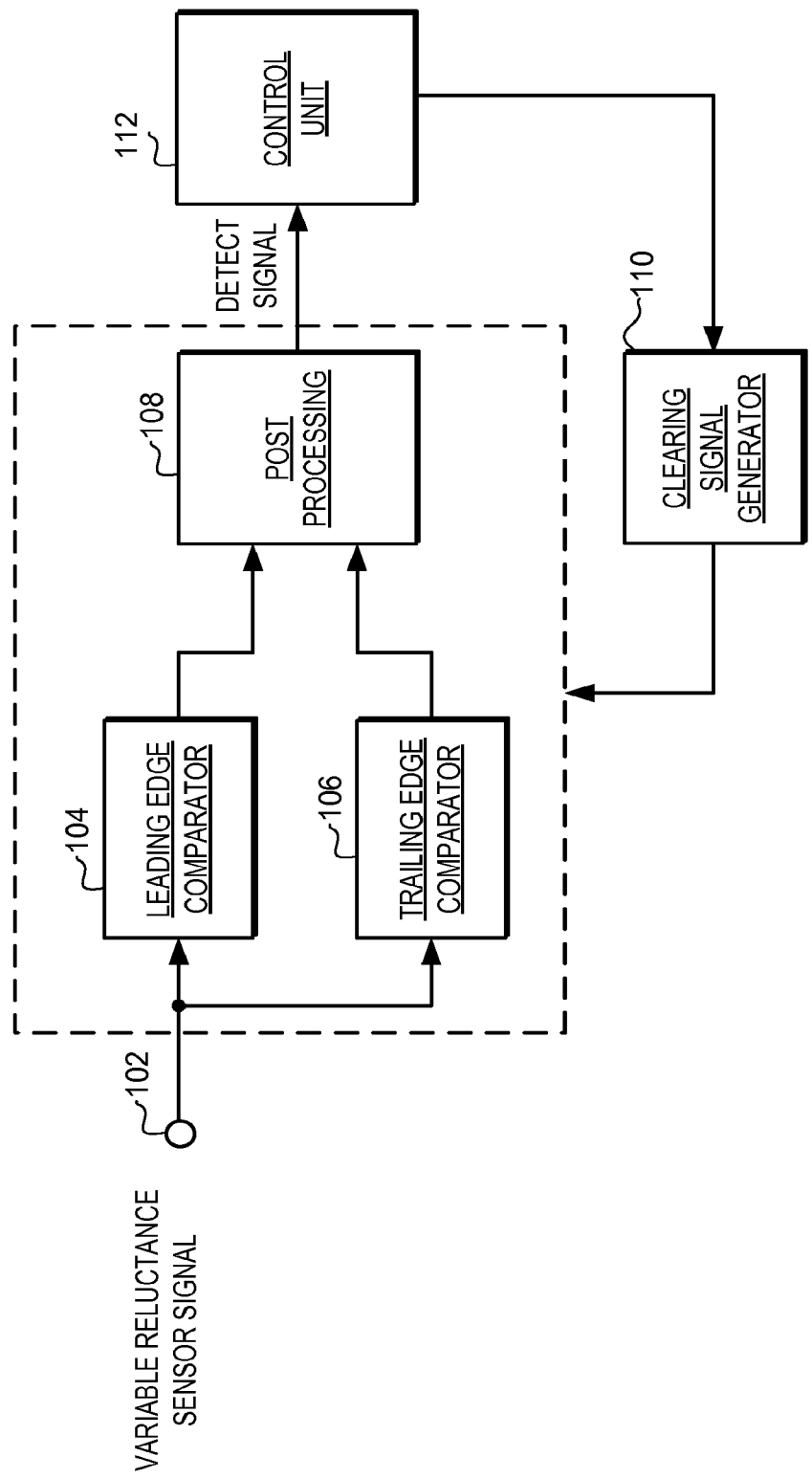
FIG. 1 is a schematic diagram of a variable reluctance sensor interface in accordance with an example embodiment.

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, or the following detailed description.

Variable reluctance sensors (VRSs) are commonly used to measure the angular position and/or speed of rotating objects. For example, they can be used to measure the angular position and/or speed of a rotating shaft such as a crank or cam shaft in an internal combustion engine where a wheel having one or more teeth is mounted on the shaft. Typical VRSs include a coil and biasing magnet positioned near a toothed wheel, and each tooth passing by the VRS causes a change in the magnetic flux which is converted to an electrical voltage induced in the coil. This induced voltage is commonly called a VRS signal. A VRS interface senses and conditions the VRS signal into a digitized version allowing a microcontroller to derive timing parameters from the wheel. In this manner, the rotating motion of the wheel is converted to an electronic signal which is used to determine the angular position and/or speed of the wheel.

In one example the VRS signal is processed to generate a detect signal pulse corresponding to the tooth width in degrees. Specifically, the increase in VRS signal caused by the leading edge of the tooth passing by the VRS biasing magnet is detected by the VRS and used to generate the leading edge of the detect signal pulse. Likewise, the decrease in VRS signal caused by the trailing edge of the tooth passing by the VRS magnet is detected and used to generate the trailing edge of the detect signal pulse. In a typical implementation the detections of these edges are performed by comparators that receive the VRS signal, with a first comparator used to detect the leading edge of the tooth and a second comparator used to detect the trailing edge of the tooth. The two detections together generate the detect signal pulse with a width that corresponds to the timing difference between the leading and trailing edges of the tooth. Thus generated the rising and falling edges of the detect signal pulse can be used to determine the angular position(s) and/or speed of the tooth and the wheel.

In many cases the accurate generation of the detect signal pulse can be negatively impacted by the effects of various physical properties of the electro-mechanical system, such as synchronous and asynchronous noise, the dynamic range of the input signal, and signal variations caused by aging and mechanical tolerances, such as tooth variations, relative placement between the sensor and tooth placement, etc. As one example, in VRS systems used to control ignition timing for internal combustion engines noise spikes in the VRS signal can be caused by the generation of the ignition spark. For example, turning to FIG. 7, graphical representations of an exemplary VRS signal 702, leading edge signal 704, trailing edge signal 706, and a resulting detect signal 708 generated by a VRS interface are illustrated. In this example the detect signal 708 has an erroneous transitions at time T4 caused by noise in the VSR signal 702. This erroneous transition at time T4 does not correspond to an actual edge of the tooth, and thus can result in an erroneous determination of position and/or speed of the wheel.

Figure 7:
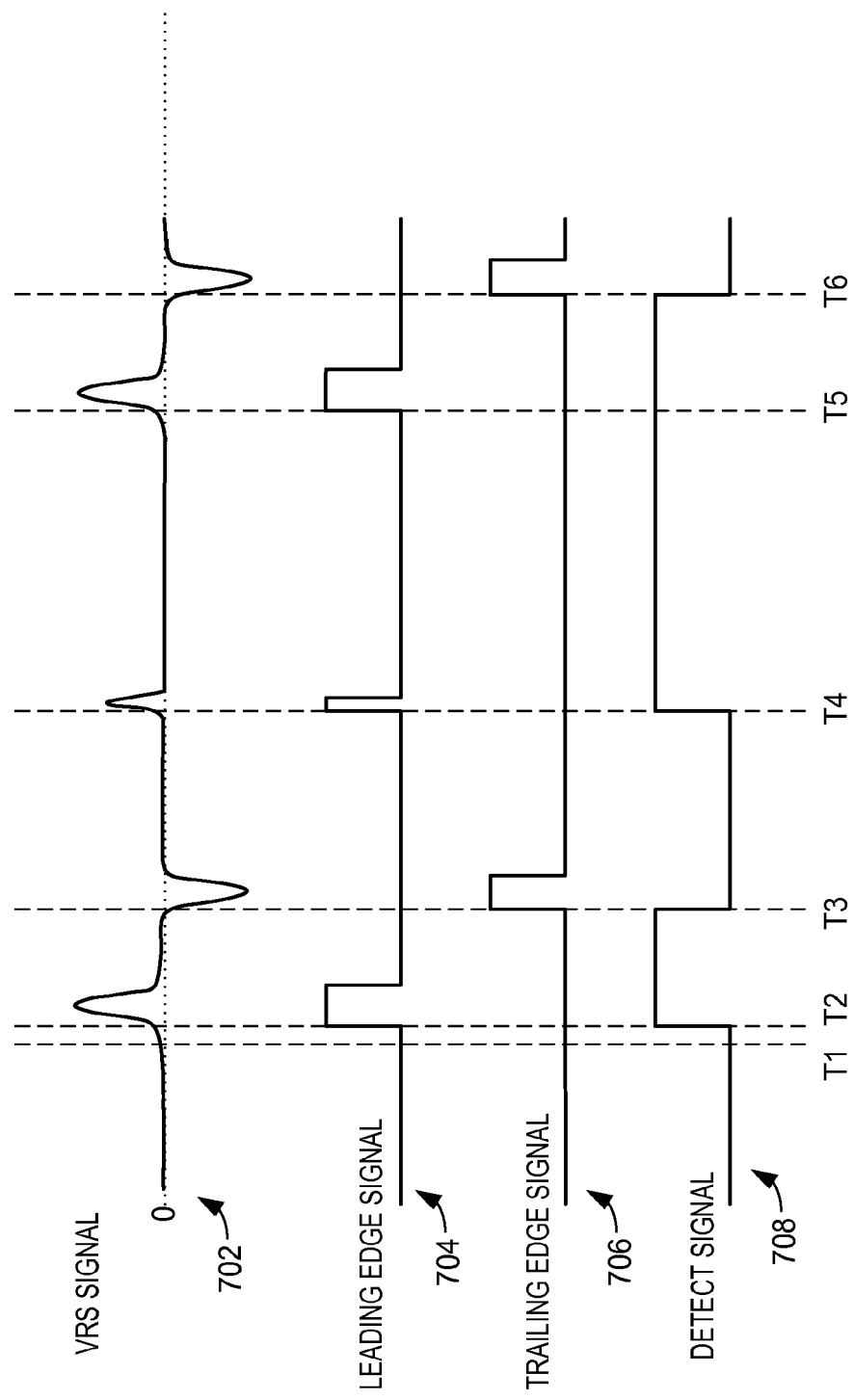
FIG. 7 is a graphical representation of a variable reluctance sensor signal, leading edge signal, trailing edge signal, and detect signal pulse without the use of clearing.

In the example of FIG. 7 at time T1 the VRS signal 702 begins to increase in response to the leading edge of the tooth rotating toward the sensor and the resulting change in magnetic flux detected by the VRS. At time T2 the VRS interface asserts the leading edge signal 704 and generates the leading edge of a detect signal 708 pulse in response to the resulting VRS signal 702 rising above a threshold value. The VRS signal 702 peaks, then, as the leading edge of the tooth passes the sensor the VRS signal 702 drops as the change in flux ceases. When the trailing edge of the tooth arrives the VRS signal 702 is driven down by the resulting change in flux, then at time T3, the VRS interface asserts the trailing edge signal 706 and generates a trailing edge of the detect signal 708 pulse.

In this illustrated example noise is generated in the VRS signal 702 at time T4. As noted above, this noise can be caused by the generation of the ignition spark in an internal combustion engine. In other cases other sources can generate such a noise spike. In some cases such noise can result in erroneous transitions in the detect signal 708. In this illustrated example the noise peak at time T4 causes the leading edge signal 704 to be temporarily asserted and this generates an erroneous edge in the detect signal 708.

Furthermore, because of the bi-stable nature of some VRS interfaces, the detect signal 708 can remain asserted for some time after the noise induced transition. This can result in additional errors. Specifically, this can result in transitions that should be generated in the detect signal 708 being erroneously not generated. For example, because the detect signal 708 remains asserted no new leading edge of a detect signal 708 pulse will be generated for the next leading edge of the tooth. As an example in FIG. 7, the next leading edge of the tooth generates an increase in the VRS signal 702 at time T5. This increase in the VRS signal 702 results in the leading edge signal 704 being again asserted. However, because the detect signal 708 was already asserted at time T4 and remained asserted at T5 a new leading edge is not generated in the detect signal 708 at T5, when it should be. For systems that use such leading edges of detect signal 708 pulses to determine timing this is particularly problematic.

For example, because of the noise spike at time T4 a new leading edge is not generated at time T5 and the system may incorrectly detect acceleration between times T3 and T4 and declaration between times T4 and T6. This can cause the system to fall out of synchronization and thus not issue the ignition commands needed for proper operation and/or may result in engine damage.

In the embodiments described herein a VRS interface is provided that may reduce the probability of erroneous transitions in a detect signal. Furthermore, the VRS interface provided may also reduce the probability that transitions in the detect signal are erroneously missed. As such, the VRS interface can improve the accuracy of position and/or motion determinations, and thus can improve the performance of a wide variety of devices that use VRSs.

In general, an embodiment of a VRS interface includes a clearing signal generator configured to generate a clearing signal. The clearing signal is applied to clear a post-processing circuit. In one embodiment the clearing signal generator is configured to generate the clearing signal overlapping in time with the ignition event. In this embodiment the clearing signal can be used for "blanking", where blanking prevents unwanted transitions in a detect signal from being generated by noise (e.g., noise induced by the ignition event or other phenomena). Such blanking is particularly applicable to known synchronous noise events such as ignition spark generated noise. Thus, blanking can be used to prevent noise associated with the ignition event from generating an erroneous transition in the detect signal.

In another embodiment the clearing signal is used for "resetting". In general resetting is used to undo the effects of noise and put the detect signal in the correct state for the next tooth edge. Specifically, resetting the detect signal can clear the detect signal of the effects of previous erroneous transitions caused by noise. Resetting is particularly applicable to unpredicted and asynchronous noise events for which precise timing is not known. For example, noise events may be caused by the transmission, starter noise, etc. In such a case a reset can be made after the noise event. Such a reset after the noise event is can be made possible without knowing the precise timing of the noise event because engine speed and changes in engine speed are limited by mass and inertia, and thus general timing of the noise event and/or the timing of true tooth detections can be estimated.

Turning now to FIG. 1, a simplified schematic diagram of a VRS interface 100 is illustrated. The VRS interface 100 includes an input 102, a leading edge comparator 104, a trailing edge comparator 106, a post-processing circuit 108, and a clearing signal generator 110. The VRS interface 100 is configured to receive a VRS signal from a VRS at the input 102. A detect signal is generated by the VRS interface 100 and provided to an ignition control unit 112. As was described above VRSs are commonly used to measure the angular position and/or speed of rotating objects such as wheels having one or more teeth. In these VRSs the leading and trailing edges of a tooth passing by the VRS cause changes in the magnetic flux, and the changes affect the state of a VRS signal.

The leading edge comparator 104 is coupled to the input 102 and is configured to receive the VRS signal. The leading edge comparator 104 includes an output and is configured to provide a leading edge signal at the output responsive to the VRS signal reaching a first threshold value. Likewise the trailing edge comparator 106 is coupled to the input 102 and is configured to also receive the VRS signal. The trailing edge comparator 106 includes an output and is configured to provide a trailing edge signal at the output responsive to the VRS signal reaching a second threshold value.

The post-processing circuit 108 is configured to receive both the leading edge signal and the trailing edge signal and generate a detect signal pulse responsive to those signals. Specifically, the post-processing circuit 108 generates a detect signal pulse with a leading edge determined from the leading edge signal, and a trailing edge determined from the trailing edge signal. Thus generated, the detect signal pulse has a width corresponding to the timing difference between assertion of the leading edge signal and assertion of the trailing edge signal. This detect signal pulse can be used to determine the position and/or speed of the tooth and the wheel. Specifically, the ignition control unit 112 receives the detect signal and is configured to control ignition timing based at least in part on the detect signal pulses conveyed within the detect signal. For example, the ignition control unit 112 can be configured to determine an angular position of a rotating shaft and control the timing of a capacitive discharge ignition based on that determination.

In accordance with the embodiments described herein the clearing signal generator 110 is configured to generate a clearing signal that may reduce the probability of erroneous transitions in the resulting detect signal. Furthermore, the clearing signal may also reduce the probability that transitions in the detect signal are erroneously missed. As such, the VRS interface 100 can provide improved accuracy of position and/or motion determinations. In general, the clearing signal generator 110 is configured to generate a clearing signal corresponding with the timing of a noise event. To facilitate this, the clearing signal generator 110 is coupled to the ignition control unit 112.

Specifically, the clearing signal generator 110 can receive timing information from the control unit 112. Such timing information can correspond to the timing of an ignition event other noise generating events. In other examples the timing information can correspond to estimates of current or future tooth positions.

In one such embodiment the control unit 112 can be configured to provide a timing signal to the clearing signal generator 110 shortly before an anticipated noise event. The clearing signal generator 110 can then provide a clearing signal to other portions of the VRS interface 100 to prevent signals from either the leading edge comparator 104, the trailing edge comparator 106, or both from causing changes in the state of post-processing circuit 108.

In one specific embodiment the control unit 112 is configured to issue a trigger signal used to initiate an ignition event. The control unit 112 can provide a timing signal to the clearing signal generator 110 indicating the timing of the ignition event. The clearing signal generator 110 can subsequently generate the clearing signal based on the timing signal, and continue to assert the clearing signal for as long as the ignition event is expected to cause noise or interference. For example, the clearing signal can be asserted for around one or more hundred microseconds, although it may be asserted for longer or shorter time periods, as well. The clearing signal generator 110 thus generates the clearing signal to bracket the ignition event in time and prevents changes to the detect signal during that time period. Stated another way, the clearing signal generator 110 can be configured to generate the clearing signal overlapping in time with the ignition event to prevent noise associated with the ignition event from generating an erroneous transition in the detect signal.

In another embodiment the clearing signal generator 110 is configured to generate a clearing signal after the ignition event. In this embodiment the clearing signal can reset the post-processing circuit 108 after any erroneous transitions generated by the noise associated with the ignition event or any other phenomena. In this embodiment resetting the post-processing circuit 108 ensures that the post-processing circuit 108 will be ready to generate a new transition in the detect signal in response to a subsequent tooth edge passing by the VRS.

In another embodiment timing information from the control unit 112 can be used to estimate when a reset should be initiated after a noise event without having precise knowledge of when the noise event will occur. In such an embodiment the control unit 112 can detect current engine speed (e.g., revolutions per minute (RPM)) and crank position, and can be programmed with the possible rates of acceleration at different RPMs. From this information the timing of the arrival of the next tooth edge can be estimated, and the clearing signal generator 110 can be used to reset the post-processing circuit 108 before the arrival of the next tooth edge. Specifically, a timing signal can thus be provided to the clearing signal generator 110 by the control unit 112, and the clearing signal generator 110 can generate a clearing signal based on the timing signal before the arrival of the next tooth edge. For example, depending upon engine speed, the clearing signal generator 110 can generate the clearing signal a couple of milliseconds to several hundred milliseconds before the next anticipated edge, although the signal may be generated closer or farther in time before the next anticipated edge, as well.

So generated the clearing signal can thus cause a reset to occur to before the next anticipated tooth edge. Furthermore, such a reset can be performed during a time period when the detect signal is not being used for engine timing. The reset can thus compensate for any previous effects of noise and interference and prepare the VRS interface 100 for the next tooth edge without interfering with the use of the detect signal or the operation of the VRS interface 100.

The VRS interface 100 can be used in a variety of different applications. For example, a toothed wheel can comprise a trigger wheel coupled to a rotating shaft, with the detect signal pulse then used to determine an angular position of the rotating shaft. In such examples the detect signal pulse can be used to generate ignition events for internal combustion engines. In these embodiments the VRS is used to sense the rotation of a crankshaft. From this, the crankshaft position and top dead center can be used to set engine timing, including ignition and fuel injection timing and the like. For example, the VRS can be used in a capacitive discharge ignition (CDI) system. In CDI systems capacitor discharge current is used to fire the spark plugs in an internal combustion engine. CDI systems do not typically suffer from the long charging times associated with the inductance coils used in inductive discharge systems. As such, CDI systems are particularly applicable to high speed engines, but CDI systems are also used in a wide variety of other engines. CDI systems commonly employ one or more relatively large teeth spanning a relatively large angular range around the circumference of the wheel. For example, CDI systems can use one or more teeth that span a range between about 20 degrees to about 70 degrees, with teeth between about 30 and 60 degrees being commonly used. However, the magnetic properties of such a wide tooth are large with respect to the VRS, making the system susceptible to noise. Such noise can lead to erroneous transitions in the detect signal between edges as was illustrated in FIG. 7. The embodiments described herein thus can be used to reduce the probability that such noise will generate erroneous transitions in the detect signal. And thus, the embodiments described herein are particularly applicable for use in controlling ignition timing in CDI or other type of systems.

In the illustrated embodiment the clearing generator 110 is illustrated as a separate element from the post-processing circuit 108 and the ignition control unit 112. However, this is just one example, and in other embodiments the clearing signal generator 110 could be implemented as part of the post-processing circuit 108 and/or the ignition control unit 112. In some embodiments the entire ignition control system could be implemented together as a single device. In other embodiments the ignition control system could be implemented as a collection of separate devices.

Figure 2:
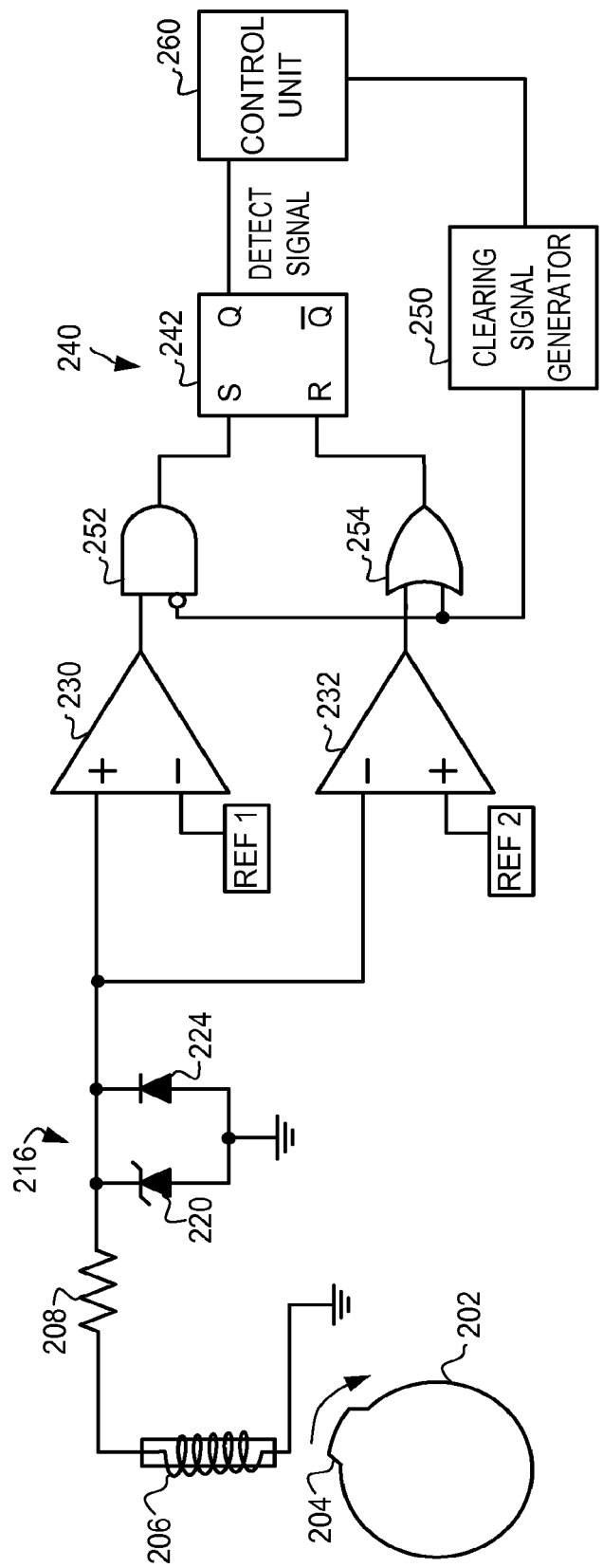
FIG. 2 is a schematic diagram of a variable reluctance sensor interface in accordance with another example embodiment.

Turning now to FIG. 2, a schematic diagram of another embodiment of a VRS interface 200 is illustrated. The VRS interface 200 includes a resistor 208, a clamping circuit 216, a leading edge comparator 230, a trailing edge comparator 232, a post-processing circuit 240, a clearing signal generator 250, a logic AND gate 252, and a logic OR gate 254.

In this illustrated example the VRS interface 200 is coupled to a VRS 206. The VRS 206 generates a VRS signal which is processed by VRS interface 200. Specifically, the VRS 206 is configured to sense the rotation of a tooth 204 on a trigger wheel 202. In the illustrated configuration, the VRS 206 includes a coil and a biasing magnet which in the example is orthogonally positioned relative to the trigger wheel 202. The trigger wheel 202 is mounted to a crankshaft (not shown) or other rotating member. The trigger wheel 202 is configured as a toothed wheel, and the VRS 206 senses each passing of the tooth 204. Specifically, as the trigger wheel 202 rotates, each passing of the tooth 204 causes a change in the magnetic flux from the biasing magnet through the coil. The coil converts this changing magnetic flux to an electrical VRS signal. The VRS signal is applied to the VRS interface 200 at the input node of resistor 208. The actual form of the VRS signal generated by the VRS 206 depends on various system parameters, such as the shape and configuration of the teeth, the position and/or orientation of the VRS 206, etc. Furthermore, it should be noted that while the wheel 202 includes only one tooth 204, that this is just one example and the embodiments described herein can be applied to wheels with multiple teeth.

The resistor 208 and the clamping circuit 216 serve to limit the current and voltage swings in the interface 200 to acceptable levels. Specifically, clamping circuit 216 is implemented with the diodes 220 and 224. The diodes 220 and 224 serve to limit voltage swings in the VRS interface 200 to acceptable levels. Likewise, the resistor 208 serves to limit current through the VRS interface 200.

After passing through transistor 208, the VRS signal is provided to the non-inverting (+) input of the leading edge comparator 230 and to the inverting (−) input of the trailing edge comparator 232. A first reference signal is provided to the inverting input of the leading edge comparator 230, as indicated by REF 1. Likewise, a second reference signal is provided to the non-inverting input of the trailing edge comparator 232, as indicated by REF 2.

In some embodiments REF 1 and/or REF 2 provide the same or equivalent reference signals. For example, in some embodiments both inputs are grounded. In other embodiments different reference signals are provided by REF 1 and REF 2 to the inputs. For example, different voltage values can be provided to individually control the reference values and thus the switching points of the comparators 230 and 232.

During operation the leading edge comparator 230 outputs a leading edge signal to one input of the post-processing circuit 240 through the AND gate 252. This leading edge signal is asserted when a leading edge of a tooth 204 causes an increase in the VRS signal above the first threshold value determined by REF 1. Likewise, the trailing edge comparator 232 outputs a trailing edge signal through the OR gate 252 to the other input of the post-processing circuit 240. This trailing edge signal is asserted when a trailing edge of a tooth 204 causes a decrease in the VRS signal below the second threshold value determined by REF 2.

In this illustrated embodiment the post-processing circuit 240 is implemented with a set-reset (SR) latch 242. The leading edge signal is provided to the first input (i.e., the set input) of the latch 242, and the trailing edge signal is provided to the second input (i.e., the reset input) of the latch 242. The latch 242 output asserts in response to an asserted first input, and the latch 242 output de-asserts (or resets) in response to an asserted reset input. Thus, the latch 242 operates to generate detect signal pulses with the timing of the leading edge of the pulse determined by the assertion of the leading edge signal and the timing of the trailing edge of the pulse determined by the assertion of the trailing edge signal. It should be noted that the SR latch 242 is just one example of the type of circuit that can be used for post-processing circuit 240. For example, other latches and other logic circuits can be used.

The detect signal is provided to a control unit 260. Specifically, the control unit 260 receives the detect signal pulse and is configured to control ignition timing based at least in part on the timing of the detect signal pulses. For example, the control unit 260 can be configured to determine an angular position of a rotating shaft and control the timing of a capacitive discharge ignition based on that determination.

In accordance with the embodiments described herein the clearing signal generator 250 is configured generate a clearing signal that may be used reduce the probability of erroneous transitions in the resulting detect signal. Furthermore, the use of the clearing signal may also reduce the probability that transitions in the detect signal are erroneously missed. In one embodiment, the clearing signal generator 250 is configured to generate a clearing signal in advance of the next anticipated tooth. Such a clearing signal can be generated to correspond to the timing of synchronous noise, such as noise caused by ignition events that are generated based on detection of the tooth. To facilitate this, the clearing signal generator 250 is coupled to the control unit 260 to receive an indication of timing. For example, to receive a timing signal that indicates the opening of a window of acceptance for valid tooth edges. Such a timing signal can thus be used to facilitate the generating of the clearing signal synchronously with the angular position of the crank tooth adjusted by a margin to account for engine acceleration. As such the timing signal can be used to generate a clearing signal that is synchronous with a noise event, such as noise caused by ignition events.

The clearing signal generator 250 is coupled to the AND gate 252 and the OR gate 254. The clearing signal generator 250 generates the clearing signal and applies the clearing signal to an inverted input of the AND gate 252 and to an input the OR gate 254.

The AND gate 252 output signal has a low logical state whenever the clearing signal is asserted. When the clearing signal is not asserted the AND gate 252 will output a signal with a high logical state when the leading edge signal is asserted. Stated another way, when the clearing signal is asserted the AND gate 252 will block the leading edge signal, and when the clearing signal is not asserted the AND gate 252 will pass the leading edge signal. Likewise, the OR gate 254 will output a signal that has a high logical state whenever the clearing signal is asserted or whenever the trailing edge signal is asserted. Stated another way, the OR gate 254 will pass the clearing signal and/or the trailing edge signal when either signal is asserted.

Thus, whenever the clearing signal is asserted the set input to the latch 242 will be low and the reset input to the latch 242 will be high. This resets the latch 242, making the latch output the detect signal with a low logical state. Furthermore, the clearing signal will continue to the hold the detect signal low as long as the clearing signal is asserted. As will be described in greater detail below, this allows the clearing signal to be used to prevent erroneous transitions in the detect signal.

When the clearing signal is de-asserted the AND gate 252 will again pass the leading edge signal. Thus, the latch 242 will have been reset and ready for detection of the next leading or trailing edge of the tooth 204. This allows the clearing signal to be used to reset erroneous transitions that may have been previously generated.

It should be noted that while the AND gate 252 and OR gate 254 are illustrated as separate from the clearing signal generator 250, that this is just one example. In other embodiments the gates 252 and 254 could be implemented as part of the clearing signal generator 250.

In one embodiment the clearing signal generator 250 is configured to generate the clearing signal overlapping in time with an ignition event. For example, the clearing signal can be asserted from a time shortly before the ignition event to shortly after the ignition event. In this embodiment the clearing signal can prevent the noise associated with the ignition event from generating an erroneous transition in the detect signal. Specifically, the assertion of the clearing signal prevents an erroneous leading edge signal from passing to the latch 242. Thus, the latch 242 does not generate an erroneous transition in the detect signal.

In another embodiment the clearing signal generator 250 is configured to generate the clearing signal after a potential noise event but before the next tooth edge. For example, by the clearing signal generator 250 asserting the clearing signal a set time or crank angle. In this embodiment the clearing signal can reset the latch 242 after any erroneous transitions generated by the noise event, including asynchronous noise events. Specifically, the assertion of the clearing signal causes the latch 242 to reset. Thus, the latch 242 is ready for detection of the next edge of the tooth 204. Thus, in this embodiment resetting the latch 242 ensures that the VRS interface 200 will be ready to generate new transitions in the detect signal in response to the subsequent tooth edge.

Figure 3:
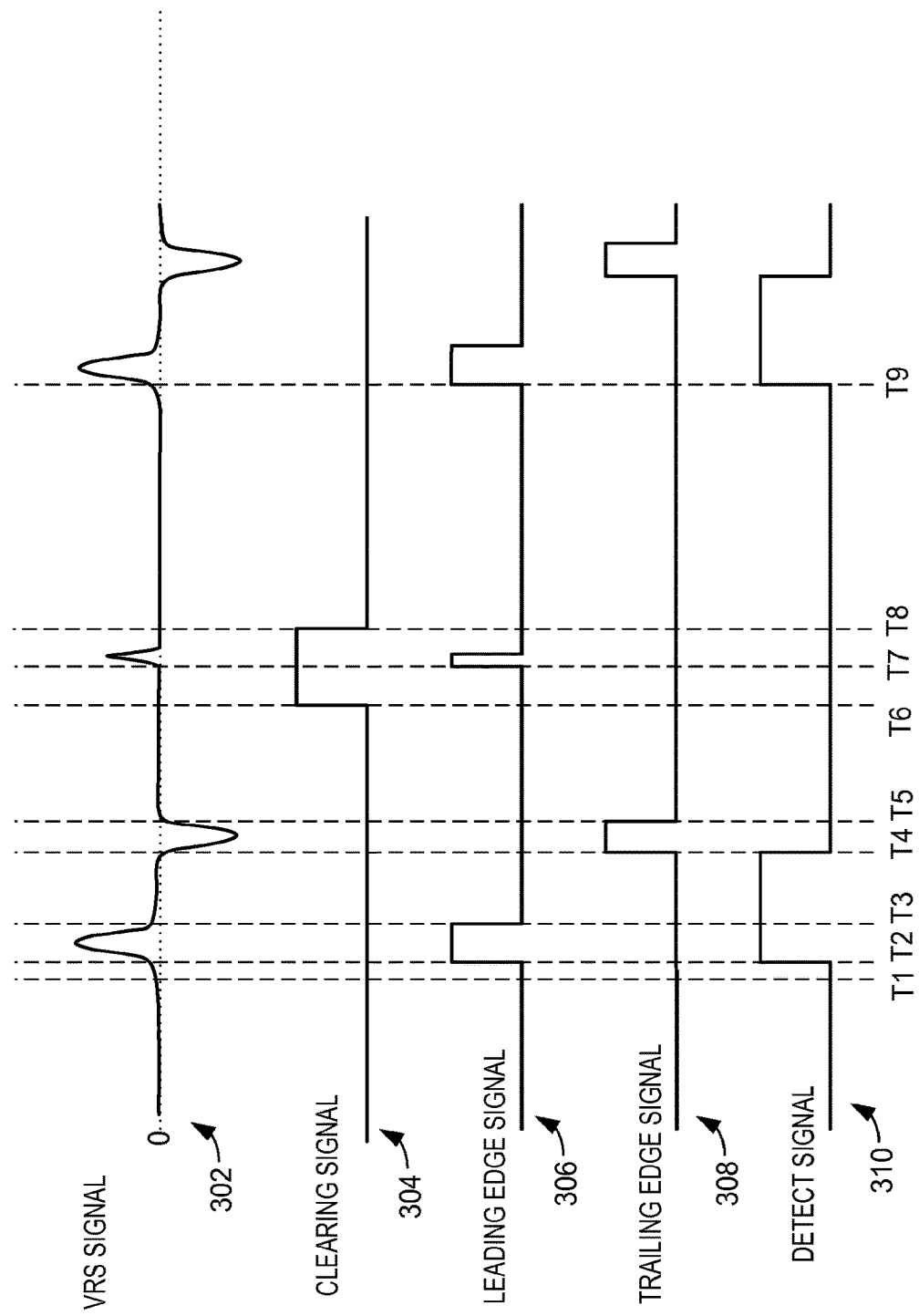
FIG. 3 is a graphical representation of a variable reluctance sensor signal, clearing signal, leading edge signal, trailing edge signal, and detect signal pulse in accordance with an example embodiment.

Turning now to FIG. 3, a graphical representation of an exemplary VRS signal 302, a clearing signal 304, leading edge signal 306, a trailing edge signal 308, and a resulting detect signal 310 generated by the VRS interface 200 are illustrated. In this example a noise spike occurs in the VRS signal 302 at time T7, but the clearing signal 304 is used to prevent an erroneous transition in the detect signal 310 from being generated in response to that noise spike.

Referring now to FIGS. 2 and 3 together, in general, during operation between times T1 and T5, the VRS signal 302 increases in response to the leading tooth edge, decreases when the tooth 204 is aligned with the VRS 206, and then decreases further as the trailing tooth edge passes the VRS 206 and the tooth 204 begins to retreat from the VRS 206 reaching a negative peak. The next passing of the tooth 204 (e.g., starting at T9) generates similar positive and negative peaks in the VRS signal 302 after any dead-time period (e.g., between T5 and T9) between passing of the tooth 204 or other such consecutive teeth. At time T1 the VRS signal 302 begins to increase in response to the leading edge of the tooth 204 rotating to the VRS 206 and the resulting change in magnetic flux. At time T2 the VRS signal 302 rises above the first threshold defined by REF 1 and the leading edge comparator 230 asserts the leading edge signal 306. The assertion of the leading edge signal 306 causes the post-processing circuit 240 to generate the leading edge of a detect signal 310 pulse. Then, in response to the leading edge of the tooth 204 passing the VRS 206 the VRS signal 302 drops as the change in flux ceases. When the trailing edge of the tooth 204 passes the VRS 206 the VRS signal 302 is driven low. At time T4 the VRS signal 302 drops below the second threshold value defined by REF2. This causes trailing edge signal 308 to be asserted and the corresponding trailing edge of the detect signal 310 pulse to be correctly generated at time T4.

Thus generated, the detect signal 310 pulse has a width corresponding to the timing difference between the actual leading edge and trailing edge of the tooth 204 passing by the VRS 206. Both edges of this detect signal pulse can thus be used to accurately determine the angular position and/or rotational speed of the tooth 204 and the wheel 202.

Next, the trailing edge of the tooth 204 retreats from the VRS 206 and in response the VRS signal 302 returns to zero as the change in flux again ceases. At time T5 the trailing edge comparator 232 de-asserts the trailing edge signal 308.

At time T6 the clearing signal 304 is asserted. This assertion of the clearing signal 304 occurs before the occurrence of the noise spike in the VRS signal 302 at time T7 and continues until time T8. Thus, in this embodiment the clearing signal 304 is overlapping in time with the time period associated with the noise spike, and thus may prevent erroneous transitions in the detect signal 310 from being generated in response to the noise spike. Specifically, as was described above the assertion of the clearing signal 304 will drive the set input to the latch 242 low and the reset input of the latch 242 high. This holds the detect signal 310 low. Furthermore, the clearing signal 304 will continue to the hold the detect signal 310 low as long as the clearing signal is asserted. This holding of the detect signal 310 low prevents unwanted transitions in the detect signal 310 and thus can be described as blanking the effects of anticipated noise events on the detect signal 310.

In one embodiment the noise spike corresponds to noise generated in the VRS 206 due to an ignition event. These types of noise generally occur synchronously with the ignition event, and thus they can occur at predictable times. That predictability allows the clearing signal generator 250 to consistently generate the clearing signal 304 at times that will overlap the noise associated with the ignition events. Thus, the clearing signal 304 can be used for blanking and can reliably prevent the noise associated with the ignition event from generating an erroneous transition in the detect signal 310.

At time T8 the clearing signal 304 is de-asserted and the AND gate 252 will again pass the leading edge signal 306. Thus, the latch 242 will have been reset and ready for the next leading or trailing edge of the tooth 204. In FIG. 3, the next leading edge of the tooth 204 is sensed at time T9, thus resulting in a new leading edge of a detect signal 310 pulse at time T9.

Figure 4:
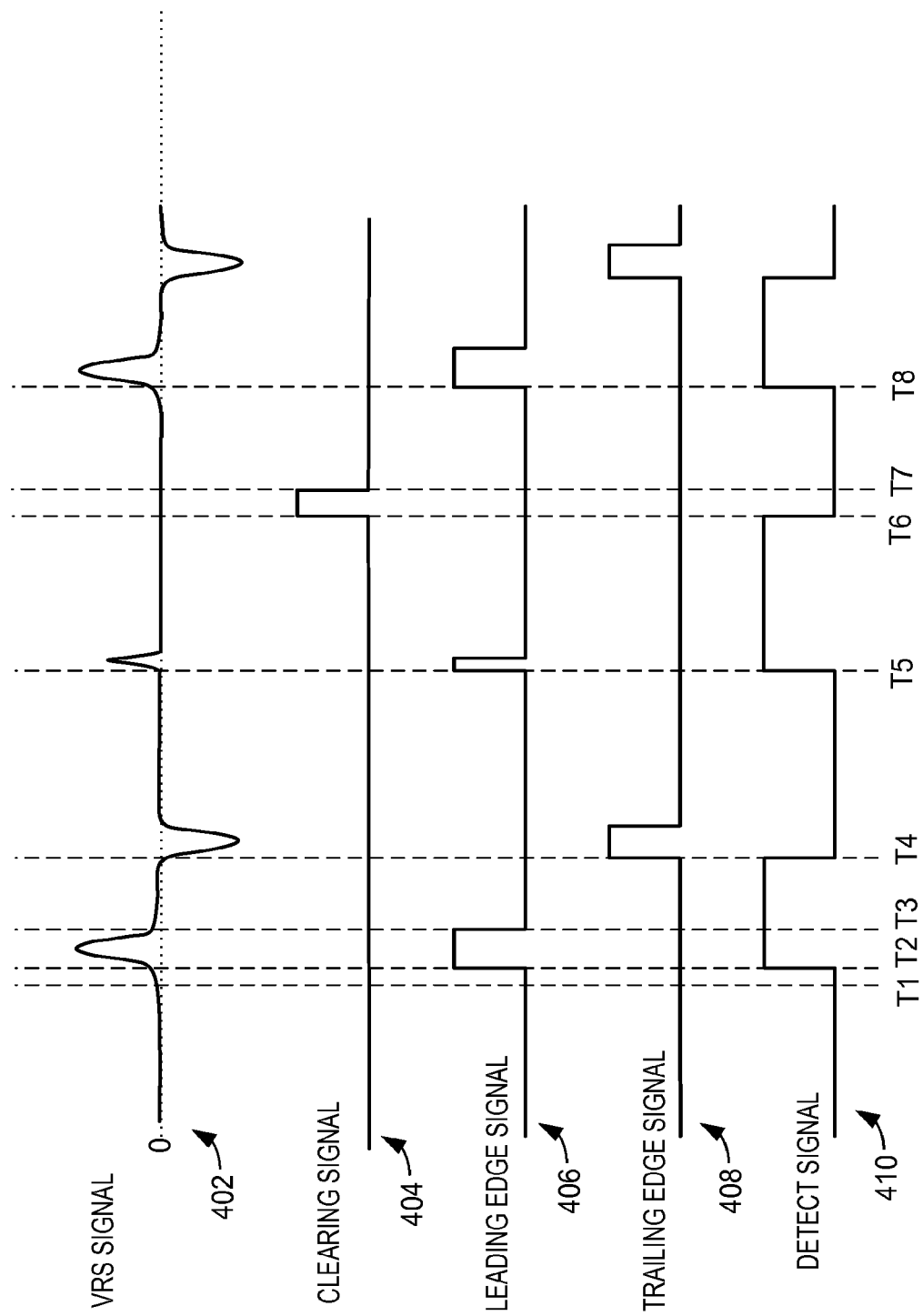
FIG. 4 is a graphical representation of a variable reluctance sensor signal, clearing signal, leading edge signal, trailing edge signal, and detect signal pulse in accordance with an example embodiment.

Turning now to FIG. 4, a second graphical representation of an exemplary VRS signal 402, a clearing signal 404, a leading edge signal 406, a trailing edge signal 408, and a resulting detect signal 410 generated by the VRS interface 200 are illustrated. In this example a noise spike again occurs in the VRS signal 402 at time T5. In contrast with the previous example however, the assertion of the clearing signal 404 does not overlap in time with the noise spike, and thus an erroneous transition in the detect signal 410 occurs at time T5 in FIG. 4. However, in this embodiment the clearing signal 404 is used reset the VRS interface latch 242 and prepare the VRS interface 200 for the next leading edge of the tooth 204. Thus, in this embodiment the clearing signal 404 is used for resetting rather than for blanking as illustrated in FIG. 3.

Referring now to FIGS. 2 and 4 together, in general, during operation the VRS signal 402 again increases in response to the leading tooth edge and decreases when the tooth 204 is aligned with the VRS 206, and then decreases further as the trailing tooth edge passes and the tooth 204 begins to retreat from the VRS 206 reaching a negative peak. At time T1 the VRS signal 402 begins to increase in response to the leading edge of the tooth 204, and at time T2 the VRS signal 402 rises and the leading edge comparator 230 asserts the leading edge signal 406. This causes the post-processing circuit 240 to generate the leading edge of a detect signal 410 pulse. When the trailing edge of the tooth 204 passes the VRS 206 the VRS signal 402 is driven low.

A time T4 this causes the trailing edge signal 408 to be asserted and the corresponding trailing edge of the detect signal 410 pulse to be correctly generated at time T4.

At time T5 a noise spike occurs. In one embodiment the noise spike corresponds to asynchronous noise that can be generated from diverse elements such as electrical elements, transmissions and braking. The noise spike at time T5 causes the leading edge signal 406 to be asserted, which results in an erroneous transition in the detect signal 410, both also occurring at time T5.

At time T6 the clearing signal 404 is asserted. As was described above the assertion of the clearing signal 404 will drive the set input to the latch 242 low and the reset input to the latch 242 high. This resets the latch 242, and de-asserts the detect signal 410. At time T7 the clearing signal 404 is de-asserted. The de-assertion of the clearing signal 404 again allows the leading edge signal 406 and the trailing edge signal 408 to pass through the gates 252 and 254 to the latch 242. This effectively makes the VRS interface 200, including the latch 242, ready for the next leading edge of the tooth 204. In FIG. 4, the next leading edge of the tooth 204 is sensed at time T8, thus resulting in a new leading edge of a detect signal 410 pulse at time T8.

It should be noted that because the embodiment illustrated in FIG. 4 does not require that the clearing signal 404 pulse overlap the noise this embodiment can be used when the noise spike is less predictable in time. For example, such an embodiment may be particularly advantageous in applications where the source of interference is asynchronous to engine position, such as a relay for an engine cooling fan.

Figure 5:
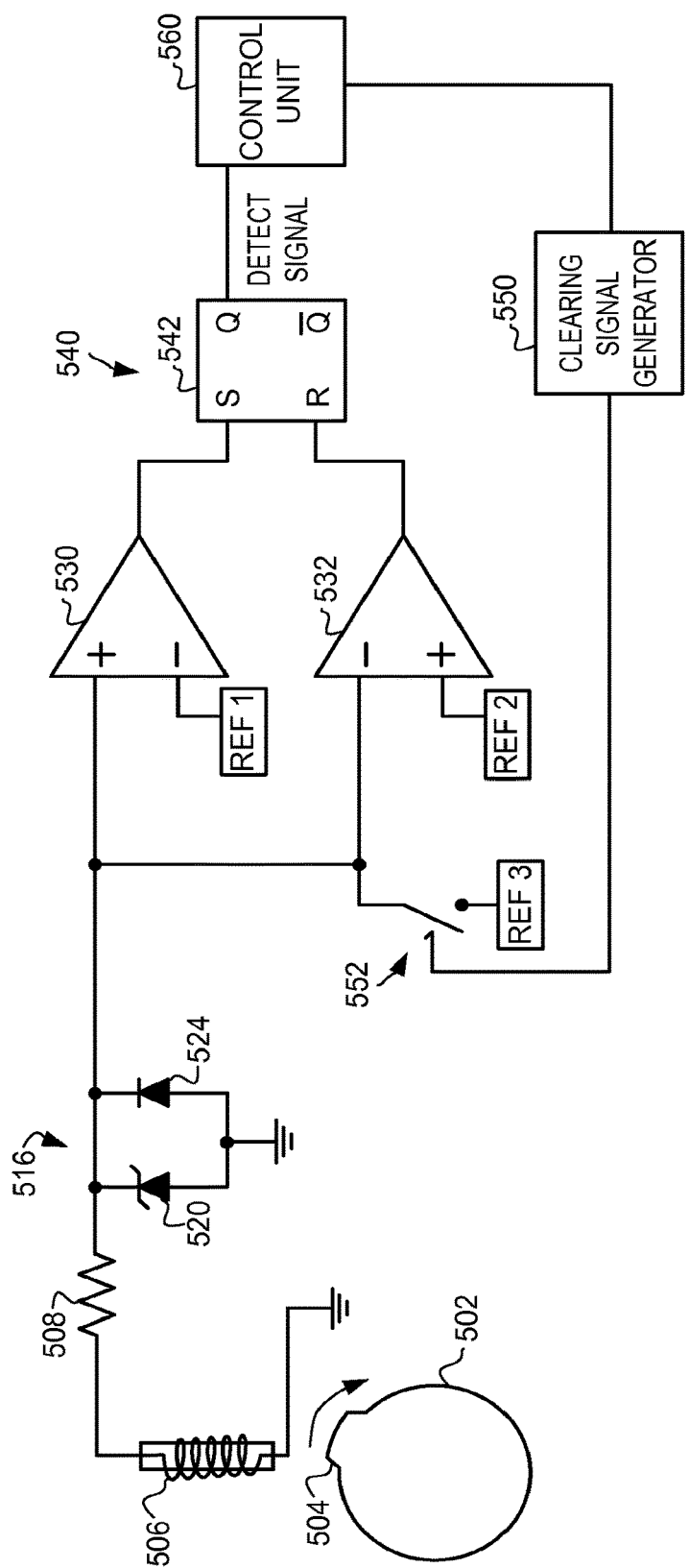
FIG. 5 is a schematic diagram of a variable reluctance sensor interface in accordance with another example embodiment.

Turning now to FIG. 5, a schematic diagram of another embodiment of a VRS interface 500 is illustrated. The VRS interface 500 includes a resistor 508, a clamping circuit 516, a leading edge comparator 530, a trailing edge comparator 532, a post-processing circuit 540, a clearing signal generator 550, and a switch 552. The VRS interface 500 is configured to receive reference voltages REF 1, REF 2, and REF 3.

In this illustrated example the VRS interface 500 is coupled to a VRS 506. The VRS 506 generates a VRS signal which is processed by VRS interface 500. Specifically, the VRS 506 is configured to sense the rotation of a tooth 504 on a trigger wheel 502. The trigger wheel 502 is configured as a toothed wheel, and the VRS 506 senses each passing of the tooth 504. Specifically, as the trigger wheel 502 rotates, each passing of the tooth 504 causes a change in the magnetic flux from the biasing magnet through the coil. The coil converts this changing magnetic flux to an electrical VRS signal.

Again, the resistor 508 and the clamping circuit 516 serve to limit the current and voltage swings in the VRS interface 500 to acceptable levels. Specifically, clamping circuit 516 is implemented with the diodes 520 and 524. The diodes 520 and 524 serve to limit voltage swings in the VRS interface 500 to acceptable levels. Likewise, the resistor 508 serves to limit current through the VRS interface 500.

After passing through resistor 508, the VRS signal is provided to the non-inverting (+) input of the leading edge comparator 530 and to the inverting (−) input of the trailing edge comparator 532. A first reference signal is provided to the inverting input of the leading edge comparator 530, as indicated by REF 1. Likewise, a second reference signal is provided to the non-inverting input of the trailing edge comparator 532, as indicated by REF 2.

During operation the leading edge comparator 530 outputs a leading edge signal to one input of the post-processing circuit 540. This leading edge signal is asserted when a leading edge of a tooth 504 causes an increase in the VRS signal above the first threshold value determined by REF 1. Likewise, the trailing edge comparator 532 outputs a trailing edge signal to the other input of the post-processing circuit 540. This trailing edge signal is asserted when a trailing edge of a tooth 504 causes a decrease in the VRS signal below the second threshold value determined by REF 2.

In this illustrated embodiment the post-processing circuit 540 is implemented with a set-reset (SR) latch 542. The leading edge signal is provided to the first input (i.e., the set input) of the latch 542, and the trailing edge signal is provided to the second input (i.e., the reset input) of the latch 542. It should be noted that the SR latch 542 is just one example of the type of circuit that can be used for post-processing circuit 540. For example, other latches and other logic circuits can be used.

The detect signal is provided to a control unit 560. Specifically, the control unit 560 receives the detect signal and is configured to control ignition timing based at least in part on detect signal pulses within the detect signal. For example, the control unit 560 can be configured to determine an angular position of a rotating shaft and control the timing of a capacitive discharge ignition based on that determination.

In accordance with the embodiments described herein the clearing signal generator 550 is configured generate a clearing signal that may be used reduce the probability of erroneous transitions in the resulting detect signal. Furthermore, the use of the clearing signal may also reduce the probability that transitions in the detect signal are erroneously missed. To facilitate this, the clearing signal generator 550 is coupled to the control unit 560 and thus can be used to facilitate the generating of the clearing signal. Again, this clearing signal can be generated synchronously with the timing of noise events, or can instead be generated at some time before the predicted arrival of the next tooth edge.

The clearing signal generator 550 is coupled to the switch 552. It should be noted that while the switch 552 is illustrated as separate from the clearing signal generator 550 this is just one example, and in other embodiments the switch 552 could be implemented as part of or integrated with the clearing signal generator 550. The control unit 560 commands the clearing signal generator 550 to generate the clearing signal and selectively close the switch 552. For example, the switch 552 can be configured to close when the clearing signal is asserted.

When the switch 552 is closed the reference voltage REF 3 is applied to the non-inverting (+) input of the leading edge comparator 530 and to the inverting (−) input of the trailing edge comparator 532. In this embodiment when the switch 552 is closed the non-inverting (+) input of the leading edge comparator 530 and the inverting (−) input of the trailing edge comparator 532 are both pulled to reference voltage REF 3. Depending upon the values of REF 1, REF 2 and REF 3, this may cause a signal at the output of the leading edge comparator 530 to have a low logical state, and a signal the output of the trailing edge comparator 532 to have a low logical state. For example, if the voltage REF 3 is lower than REF 1 and higher than REF 2, the output signals from both comparators will have low logical states when the switch is closed. As one example embodiment the reference voltage REF 3 can be ground, but in other embodiments REF 3 can be a negative voltage.

Thus in this embodiment whenever the clearing signal is asserted the set input to the latch 542 will be low and the reset input to the latch 542 will also be low. With both inputs set low, the latch 542 will not change state but will remain unchanged whether high or low. Thus the effect of closing switch 552 is to blank out the VRS signal, including any noise on that signal, from affecting the detect signal. The example thus blanks but does not reset the VRS interface 500. As was described above, this allows the clearing signal to be used to prevent erroneous transitions in the detect signal, whilst allowing the detect signal to be validly either high or low. It will be appreciated that the forcing of the input signal to a static voltage, which may be ground, will have a blanking effect on any subsequent threshold based VRS interface 500.

Note that in such an embodiment the VRS interface 500 behavior can be altered by adjusting the reference voltages. For example, if REF 3 is set lower than both REF 1 and REF 2, then closing the switch 552 will cause the output signal from the leading edge comparator 530 to have a low logical value, and the output signal from the trailing edge comparator 532 to have a high logical value. As with the previous embodiment illustrated in FIG. 2, this resets the latch 542, making the detect signal have a low logical value. Furthermore, as long as the switch 552 remains closed the detect signal will remain low. As was described above, this allows the clearing signal to be used to prevent erroneous transitions in the detect signal.

When the clearing signal is de-asserted the switch 552 will open. Thus, the latch 542 will have been reset and ready for the next leading or trailing edge of the tooth 504. This allows the clearing signal to be used to reset erroneous transitions that may have been previously generated. In one embodiment the switch 552 is implemented with a transistor such as a metal oxide semiconductor field effect transistor (MOSFET). Of course, this is just one example, and other embodiments can include other devices to implement the switch 552.

And as with the embodiment in FIG. 2, the clearing signal generator 550 can be configured to generate the clearing signal overlapping in time with a noise event. For example, the clearing signal can be asserted from a time shortly before an ignition event to shortly after the ignition event. In this embodiment the clearing signal can prevent the noise associated with the ignition event from generating an erroneous transition in the detect signal, and is thus can be used to perform a blanking function.

In another embodiment the clearing signal can instead be used to perform a reset function. For example, the clearing signal can be used to perform a reset where REF 3 is lower than both REF 1 and REF 2 (e.g., when REF 3 is negative), and the clearing signal generator 550 is configured to generate the clearing signal after the noise event. In this embodiment the clearing signal can reset the latch 542 after any erroneous transitions generated by the noise event (e.g., a noise event associated with an ignition event). Specifically, the assertion of the clearing signal causes the latch 542 to reset. Thus, the latch 542 is ready for detection of the next edge of the tooth 504. Thus, in this embodiment resetting the latch 542 ensures that the VRS interface 500 will be ready to generate new transitions in the detect signal in response to detection of the subsequent tooth edge.

Figure 6:
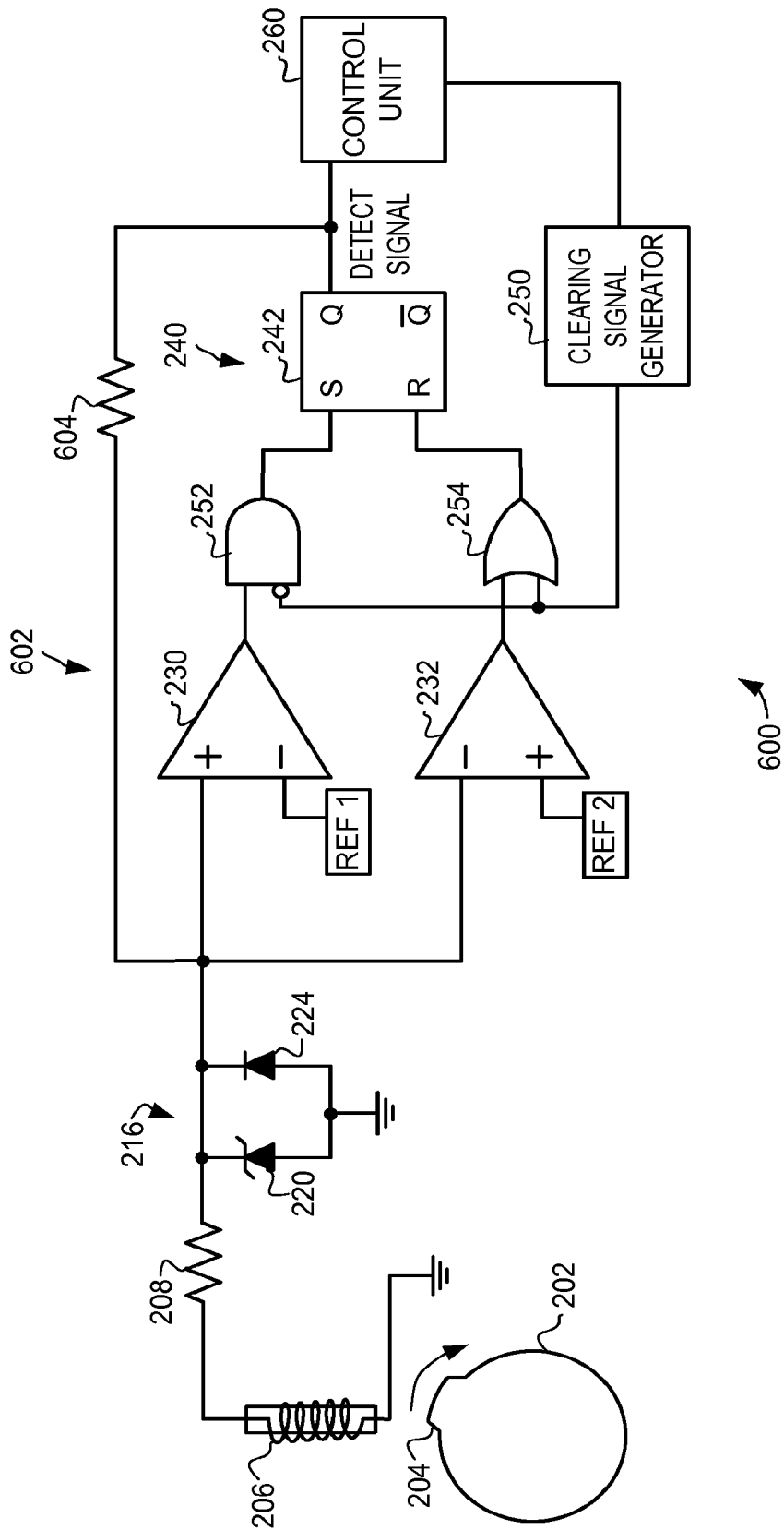
FIG. 6 is a schematic diagram of a variable reluctance sensor interface in accordance with another example embodiment.

Turning now to FIG. 6, a schematic diagram of another embodiment of a VRS interface 600 is illustrated. The VRS interface 600 is similar to that illustrated in FIG. 2, with the addition of a bias element 602. As will be described in greater detail below, the bias element 602 is implemented to provide variable biases—such as providing different DC bias levels at different times. For example, in the illustrated example, the bias element 602 is implemented to provide a bias voltage level that is determined in part by the output of the VRS interface 600.

In general, the bias element 602 is configured to selectively apply a bias voltage with the VRS signal to a first input of the leading edge comparator 230 and a first input of the trailing edge comparator 232. So configured, the bias voltage provides a DC offset to the AC VRS signal, effectively offsetting the VRS signal away from the threshold of the trailing edge comparator 232. Thus, the bias voltage may reduce the probability of erroneous transitions by reducing the probability that the offset VRS signal will drop below the second threshold voltage in between the leading and trailing edges of a tooth. This may thus prevent a trailing edge signal from being erroneously generated, and may likewise prevent erroneous transitions in the detect signal pulse.

In the embodiment of FIG. 6 the bias element 602 is implemented to provide a state dependent bias that varies with the output of the post-processing circuit 240. Thus, when the detect signal is high (e.g., during a detect signal pulse) the bias provided by the bias element 602 is at one level, and when the detect signal is low, the bias provided by the bias element 602 is at a different lower level. Furthermore, it should be noted that the bias arrangement might be applied to any non-inverting VRS interface with a digital output.

The illustrated bias element 602 comprises a resistor 604 coupled in a feedback path from the output of the post-processing circuit 240. This resistor 604 and feedback path provide a bias to the non-inverting input of the leading edge comparator 230 and to the inverting input of the trailing edge comparator 232. The level of bias provided is determined by the output voltage of the post-processing circuit 240 and the resistor divider formed by resistors 604 and 208. Thus, when the output of the post-processing circuit 240 is high, the resistor divider provides a relatively high bias level determined by this high output and the resistor ratio of the resistor divider. When the output is low (e.g., zero) the bias level is corresponding relatively low (e.g., zero).

Providing such a state dependent bias to the non-inverting input of the leading edge comparator 230 and to the inverting input of the trailing edge comparator 232 may provide advantages compared to a constant bias. For example, the state dependent bias can provide for a switch point significantly below ground (0V) for the VRS signal without requiring negative voltage references REF 1 or REF 2 or otherwise using comparators that can detect inputs below, or significantly below, 0V. Such a negative voltage switch point may provide improved immunity to noise and distortion of the VRS signal.

Specifically, the resistor 604 and the resistor 208 form a potential divider between the detect signal and the VRS signal. As was illustrated in FIGS. 3 and 4, during the period between the leading and trailing edge of the tooth the detect signal is high. Thus, a relatively high voltage determined by the potential divider and the detect signal is provided to the comparator 230 and 232 inputs when the detect signal is high. This state dependent bias provided to by the bias element 602 significantly reduces the effective switch point of the trailing edge comparator 232. Specifically, the VRS signal will need to be significantly below 0V in order to cause the negative input of the trailing edge comparator 232 to be pulled down to the switch point. Thus, the benefit of a negative voltage switch point can be provided without the use of negative reference voltages for REF 1 or REF 2. The addition of bias element 602 thus can significantly simplify the implementation of the comparator reference and supply voltages, thus potentially reducing the cost of the VRS interface 600. And again, by the implementation of a significant negative voltage switch point, the VRS interface 600 may provide greater immunity to noise and distortion of the tooth signal in comparison with an interface with a switch point at or just below 0V.

The connecting lines shown in the various figures contained herein are intended to represent exemplary functional relationships and/or physical couplings between the various elements. It should be noted that many alternative or additional functional relationships or physical connections may be present in an embodiment of the subject matter. In addition, certain terminology may also be used herein for the purpose of reference only, and thus are not intended to be limiting, and the terms "first", "second" and other such numerical terms referring to structures do not imply a sequence or order unless clearly indicated by the context.

As used herein, a "node" means any internal or external reference point, connection point, junction, signal line, conductive element, or the like, at which a given signal, logic level, voltage, data pattern, current, or quantity is present. Furthermore, two or more nodes may be realized by one physical element (and two or more signals can be multiplexed, modulated, or otherwise distinguished even though received or output at a common node).

The foregoing description refers to elements or nodes or features being "connected" or "coupled" together. As used herein, unless expressly stated otherwise, "connected" means that one element is directly joined to (or directly communicates with) another element, and not necessarily mechanically. Likewise, unless expressly stated otherwise, "coupled" means that one element is directly or indirectly joined to (or directly or indirectly communicates with, electrically or otherwise) another element, and not necessarily mechanically. Thus, although the schematics shown in the figures depict several exemplary arrangements of elements, additional intervening elements, devices, features, or components may be present in other embodiments of the depicted subject matter.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. An ignition system for an internal combustion engine, comprising:
    a variable reluctance sensor configured to sense passing of at least one tooth on a wheel in an internal combustion engine, the variable reluctance sensor configured to generate a variable reluctance sensor signal;
    a leading edge comparator including a first input configured to receive the variable reluctance sensor signal and including an output configured to provide a leading edge signal in response to the variable reluctance sensor signal reaching a first threshold value;
    a trailing edge comparator including a first input configured to receive the variable reluctance sensor signal and including an output configured to provide a trailing edge signal in response to the variable reluctance sensor signal decreasing to reach a second threshold value;
    a post-processing circuit configured to receive the leading edge signal and the trailing edge signal and generate a pulse in a detect signal having a width corresponding to a difference between the leading edge signal and the trailing edge signal;
    an ignition control unit configured to control timing of an ignition event based at least in part on the detect signal pulse; and
    a clearing signal generator configured to generate a clearing signal corresponding with the timing of the ignition event, the clearing signal generator coupled to the post-processing circuit and configured to clear the post-processing circuit in response to the clearing signal.

2. The ignition system of claim 1 wherein the clearing signal generator is configured to generate the clearing signal overlapping in time with the ignition event to prevent noise associated with the ignition event from generating an erroneous transition in the detect signal.

3. The ignition system of claim 1 wherein the clearing signal generator is configured to generate the clearing signal after the ignition event to reset the post-processing circuit after an erroneous transition generated by noise associated with the ignition event.

4. The ignition system of claim 1 wherein the clearing signal generator is coupled to the post-processing circuit through at least one gate, the at least one gate configured to selectively block the leading edge signal in response to the clearing signal.

5. The ignition system of claim 1 wherein the clearing signal generator is coupled to the post-processing circuit through a switch coupled to the first input of the leading edge comparator and the first input of the trailing edge comparator, the switch configured to selectively bias the first input of the leading edge comparator and the first input of the trailing edge comparator in response to the clearing signal.

6. The ignition system of claim 1 further comprising a feedback path from an output of the post-processing circuit to the first input of the leading edge comparator, the feedback path coupling the detect signal to the first input of the leading edge comparator to provide a state dependent bias.

7. An ignition system for an internal combustion engine, comprising:
    a variable reluctance sensor configured to sense passing of at least one tooth on a wheel in an internal combustion engine, the variable reluctance sensor configured to generate a variable reluctance sensor signal;
    a leading edge comparator including a first input configured to receive the variable reluctance sensor signal and including an output configured to provide a leading edge signal in response to the variable reluctance sensor signal reaching a first threshold value;
    a trailing edge comparator including a first input configured to receive the variable reluctance sensor signal and including an output configured to provide a trailing edge signal in response to the variable reluctance sensor signal decreasing to reach a second threshold value;
    a post-processing circuit configured to receive the leading edge signal and the trailing edge signal and generate a pulse in a detect signal having a width corresponding to a difference between the leading edge signal and the trailing edge signal;

an ignition control unit configured to control timing of an ignition event based at least in part on the detect signal pulse; and a clearing signal generator configured to generate a clearing signal at a time corresponding to a noise event, the clearing signal generator coupled to the post-processing circuit and configured to clear the post-processing circuit in response to the clearing signal.

8. The ignition system of claim 7 wherein the clearing signal generator is configured to clear the post-processing circuit by blanking the post-processing circuit during the noise event.

9. The ignition system of claim 7 wherein the clearing signal generator is configured to clear the post-processing circuit by resetting the post-processing circuit after the noise event.

10. The ignition system of claim 7 wherein the noise event comprises a synchronous noise event, and wherein the clearing signal generator is configured to generate the clearing signal overlapping in time with the synchronous noise event.

11. The ignition system of claim 7 wherein the noise event comprises a synchronous noise event, and wherein the detect signal pulse is configured to indicate timing of the ignition event, and wherein the clearing signal generator is configured to generate the clearing signal overlapping in time with the ignition event to prevent noise associated with the ignition event from generating an erroneous transition in the detect signal.

12. The ignition system of claim 7 wherein the noise event comprises a synchronous noise event, and wherein the clearing signal generator is configured to generate the clearing signal after the ignition event to reset the post-processing circuit after an erroneous transition in the detect signal caused by the ignition event.

13. The ignition system of claim 7 wherein the clearing signal generator is coupled to the post-processing circuit through at least one gate, the at least one gate configured to selectively block the leading edge signal in response to the clearing signal.

14. The ignition system of claim 7 wherein the clearing signal generator is coupled to the post-processing circuit through a switch coupled to the first input of the leading edge comparator and the first input of the trailing edge comparator, the switch configured to selectively bias the first input of the leading edge comparator and the first input of the trailing edge comparator in response to the clearing signal.

15. The ignition system of claim 7 further comprising a feedback path from an output of the post-processing circuit to the first input of the leading edge comparator, the feedback path coupling the detect signal to the first input of the leading edge comparator to provide a state dependent bias.

* * * * *